(12) United States Patent
Kasriel

(10) Patent No.: US 7,487,261 B1
(45) Date of Patent: Feb. 3, 2009

(54) DELTA CACHING SERVICE

(75) Inventor: Stephane Kasriel, San Francisco, CA (US)

(73) Assignee: Digital River, Inc., Eden Prairie, MN (US)

(*) Notice: Subject to any disclaimer, the term of this patent is extended or adjusted under 35 U.S.C. 154(b) by 315 days.

(21) Appl. No.: 10/082,493

(22) Filed: Feb. 22, 2002

(51) Int. Cl.
G06F 15/16 (2006.01)
(52) U.S. Cl. ........................ 709/246; 709/213
(58) Field of Classification Search ......... 709/246–247, 709/203, 212–219; 715/523, 513, 249; 707/E17.12; 711/137
See application file for complete search history.

(56) References Cited

U.S. PATENT DOCUMENTS

| | | | |
|---|---|---|---|
| 5,680,634 A | 10/1997 | Estes | |
| 5,727,129 A | 3/1998 | Barrett et al. | |
| 5,728,129 A | 3/1998 | Summers | |
| 5,774,660 A | 6/1998 | Brendel et al. | |
| 5,802,292 A | 9/1998 | Mogul | |
| 5,826,258 A | 10/1998 | Gupta et al. | |
| 5,835,712 A | 11/1998 | DuFresne | |
| 5,845,088 A | 12/1998 | Lewis | |
| 5,859,971 A | 1/1999 | Bittinger et al. | |
| 5,878,223 A | 3/1999 | Becker et al. | |
| 5,878,429 A | 3/1999 | Morris et al. | |
| 5,931,904 A | 8/1999 | Banga et al. | |
| 5,944,790 A | 8/1999 | Levy | |
| 5,978,841 A | 11/1999 | Berger | |
| 5,983,227 A | 11/1999 | Nazem et al. | |
| 5,987,480 A * | 11/1999 | Donohue et al. | 715/501.1 |
| 6,003,087 A | 12/1999 | Housel, III et al. | |
| 6,021,426 A * | 2/2000 | Douglis et al. | 709/200 |
| 6,026,413 A | 2/2000 | Challenger et al. | |
| 6,061,715 A | 5/2000 | Hawes | |
| 6,085,193 A | 7/2000 | Malkin et al. | |
| 6,098,152 A | 8/2000 | Mounes-Toussi | |
| 6,112,242 A | 8/2000 | Jois et al. | |

(Continued)

FOREIGN PATENT DOCUMENTS

DE 010146356 A1 4/2003

(Continued)

OTHER PUBLICATIONS

U.S. Appl. No. 09/734,910, filed Dec. 11, 2000, Kasriel, et al.

(Continued)

Primary Examiner—Salad Abdullahi
(74) Attorney, Agent, or Firm—North Oaks Patent Agency; Shawn B. Dempster

(57) ABSTRACT

A method and system for responding to a request from a client for a web page using delta caching is described. Building templates for the web at the server(s) is functionally separated and logically remote from the request server. One or more template-builders are logically separated from one or more delta-encoders. Each operates independently to perform its part of delta caching; template-builders build templates for the web page, while delta-encoders use those templates and a received web object to compute delta information for the web page. Delta-encoders, like template-builders, are logically remote from the request server. The delta information for the web page and a reference to the template can be separately sent to the client.

40 Claims, 2 Drawing Sheets

U.S. PATENT DOCUMENTS

| | | | |
|---|---|---|---|
| 6,128,655 A | 10/2000 | Fields et al. | |
| 6,138,251 A * | 10/2000 | Murphy et al. | 714/41 |
| 6,144,990 A | 11/2000 | Brandt et al. | |
| 6,178,461 B1 * | 1/2001 | Chan et al. | 709/247 |
| 6,192,382 B1 | 2/2001 | Lafer et al. | |
| 6,216,212 B1 | 4/2001 | Challenger et al. | |
| 6,249,795 B1 | 6/2001 | Douglis | |
| 6,256,712 B1 | 7/2001 | Challenger et al. | |
| 6,260,192 B1 | 7/2001 | Rosin et al. | |
| 6,263,352 B1 * | 7/2001 | Cohen | 715/513 |
| 6,314,465 B1 | 11/2001 | Paul | |
| 6,327,628 B1 | 12/2001 | Anuff et al. | |
| 6,343,318 B1 | 1/2002 | Hawkins et al. | |
| 6,374,305 B1 | 4/2002 | Gupta et al. | |
| 6,377,978 B1 | 4/2002 | Nguyen | |
| 6,397,217 B1 | 5/2002 | Melbin | |
| 6,405,252 B1 | 6/2002 | Gupta et al. | |
| 6,453,319 B1 | 9/2002 | Mattis | |
| 6,466,937 B1 * | 10/2002 | Fascenda | 707/10 |
| 6,553,413 B1 | 4/2003 | Leighton et al. | |
| 6,560,604 B1 * | 5/2003 | Fascenda | 707/10 |
| 6,606,525 B1 | 8/2003 | Muthuswamy et al. | |
| 6,623,529 B1 | 9/2003 | Lakritz | |
| 6,629,138 B1 | 9/2003 | Lambert et al. | |
| 6,697,844 B1 * | 2/2004 | Chan et al. | 709/206 |
| 6,704,024 B2 | 3/2004 | Robotham | |
| 6,721,780 B1 * | 4/2004 | Kasriel et al. | 709/203 |
| 6,728,785 B1 | 4/2004 | Jungck | |
| 6,760,746 B1 | 7/2004 | Schneider | |
| 6,826,626 B1 * | 11/2004 | McManus | 709/246 |
| 6,868,453 B1 * | 3/2005 | Watanabe | 709/234 |
| 6,873,877 B1 * | 3/2005 | Tobias et al. | 700/94 |
| 6,910,073 B2 | 6/2005 | Banga et al. | |
| 6,912,591 B2 | 6/2005 | Lash | |
| 6,944,817 B1 * | 9/2005 | Danneels | 715/513 |
| 7,058,700 B1 | 6/2006 | Casalaina | |
| 7,072,849 B1 | 7/2006 | Filepp et al. | |
| 7,072,987 B2 | 7/2006 | Jurisch et al. | |
| 7,092,977 B2 | 8/2006 | Leung et al. | |
| 7,092,997 B1 * | 8/2006 | Kasriel et al. | 709/213 |
| 7,096,418 B1 | 8/2006 | Singhal et al. | |
| 7,257,625 B2 | 8/2007 | Wu et al. | |
| 2001/0037361 A1 | 11/2001 | Croy | |
| 2001/0037400 A1 | 11/2001 | Raz et al. | |
| 2001/0056460 A1 | 12/2001 | Sahota et al. | |
| 2002/0004813 A1 | 1/2002 | Agrawal et al. | |
| 2002/0032677 A1 | 3/2002 | Morgenthaler et al. | |
| 2002/0048450 A1 | 4/2002 | Zetts | |
| 2002/0056010 A1 | 5/2002 | Lincoln et al. | |
| 2002/0062384 A1 | 5/2002 | Tso | |
| 2002/0138509 A1 * | 9/2002 | Burrows et al. | 707/501.1 |
| 2002/0138511 A1 * | 9/2002 | Psounis et al. | 707/501.1 |
| 2002/0161860 A1 | 10/2002 | Godlin et al. | |
| 2003/0009563 A1 | 1/2003 | Douglis et al. | |
| 2003/0110186 A1 | 6/2003 | Markowski et al. | |
| 2003/0110296 A1 * | 6/2003 | Kirsch et al. | 709/246 |
| 2003/0120752 A1 | 6/2003 | Corcoran | |
| 2003/0154261 A1 * | 8/2003 | Doyle et al. | 709/218 |
| 2004/0128346 A1 | 7/2004 | Melamed et al. | |
| 2004/0172458 A1 | 9/2004 | Pitts | |
| 2006/0168118 A1 | 7/2006 | Godlin et al. | |
| 2006/0168348 A1 | 7/2006 | Casalaina | |

FOREIGN PATENT DOCUMENTS

| | | |
|---|---|---|
| EP | 001662405 A1 | 5/2006 |
| JP | 02003132086 A1 | 5/2003 |
| WO | WO00/28433 A2 | 5/2000 |
| WO | WO00/28433 A3 | 5/2000 |
| WO | 02054258 A1 | 7/2002 |

OTHER PUBLICATIONS

U.S. Appl. No. 09/827,268, filed Apr. 4, 2001, Kasriel, et al.
U.S. Appl. No. 09/888,374, filed Jun. 22, 2001, Kasriel, et al.
U.S. Appl. No. 09/923,292, filed Aug. 6, 2001, Kasriel, et al.
U.S. Appl. No. 09/923,809, filed Aug. 7, 2001, Kasriel, et al.
U.S. Appl. No. 10/058,232, filed Oct. 19, 2001, Kasriel, et al.
U.S. Appl. No. 10/079,932, filed Feb. 19, 2002, Kasriel.
Goulde, M., Network Caching Guide: Optimizing Web Content Delivery, Boston, MA, Patricia Seybold Group, Mar. 1999, pp. i-42.
Delphion Intellectual Property Network to search. "Welcome to the new world of IP Information, Delphion". 1997-2001 Delphion Inc.
Jeffrey Mogul, Fred Douglis, Daniel Hellerstein. "HTTP Delta Clusters and Templates", Aug. 24, 2000. Network Working Group. Internet-Draft.
Alberto Accomazzi, "RPROXY", Proxy: Introduction. Copyright © 1999-2001 by Martin Pool unless otherwise noted.
"Active Cache: caching dynamic contents on the Web", Pei Cao, Jin Zhang and Kevin Beach, The British Computer Society, The Institution of Electrical Engineers & IOP Publishing Ltd., 1999.
Marshall Brian, How Suff Works, "How Web Servers and the Internet Work," obtained at Internet address http://www.howstuffworks.com/web-server.htm.
"Scalable Web Clusters with Static and Dynamic Contents" Casalicchio, E. Colajanni, M., IEEE International Proceedings on Conference Cluster Computing, pp. 170-177, Nov. 2000.
"Intelligent Prefetch in WWW Using Client Behavior Characterization" Swaminathan, N. Raghavan, S.V., International Symposium on Modeling, Analysis and Simulation of Computer and Telecommunication Systems, pp. 13-19, Sep. 2000.
"A Schema-Based Approach to Web Engineering" Kuhnke, C. Schneeberger, J. Turk, A., System Sciences, Schema Electronic Documentation Solutions p. 10, Jan. 2000.
A Survey of Web Caching Schemes For the Internet ACM SIGCOMM Computer Communication Review, pp. 36-46, Oct. 1999.
Client-Server Computing in Mobile Environment, Jin Jing. Abdelsalam Helal and Ahmed Elmagarmid, ACM Computing Surveys, vol. 31 No. 2, Jun. 1999.

* cited by examiner

DELTA CACHING SERVICE

RELATED APPLICATIONS

This application is related to:

U.S. patent application Ser. No. 09/734,910, filed Dec. 11, 2000, entitled "Predictive Pre-download Using Normalized Network Object Identifiers";

U.S. Patent Application Ser. No. 60/263,247, filed Jan. 22, 2001, entitled "Server Driven Differential Caching"; and U.S. patent application Ser. No. 10/058,232, filed Oct. 19, 2001, entitled "Differential Caching with Many-to-One and One-to-Many Mapping", all of which are incorporated herein by reference.

BACKGROUND OF THE INVENTION

1. Field of the Invention

The invention relates to a delta caching service, and related methods and systems.

2. Description of Related Art

In a system that delivers information from a server to clients who request that information (such as a web server delivering information to a set of web clients), it is desirable to minimize the amount of data that is actually sent from the web server to the web client. Delta caching is a technique by which the server and the client differentiate between template information and delta information for an object to be delivered from the server to the client; the client maintains a copy of the template information and the server is therefore able to deliver the object by only sending the delta information.

The web server often manages relatively large loads by dividing its tasks, using a load balancer, among a set of server-responders. However, differing server-responders might then associate different template information with objects at the server. One consequence is that when a client communicates with more than one server-responder, the template information known to the client and to the server-responder might differ. This is increasingly more likely as the number of server-responders is increased, and might result in miscommunication between a client and one or more of the server-responders.

BRIEF SUMMARY OF THE INVENTION

The invention provides a method and system capable of ensuring that each client can consistently communicate with one or more servers using delta caching. Building templates for objects at the server(s) is functionally separated from encoding objects for delivery to clients. One or more template-builders are logically separated from one or more delta-encoders. Each operates independently to perform its part of delta caching; template-builders build templates, while delta-encoders use those templates to encode objects for delta caching.

In an aspect of the invention, template-builders also operate so that those clients not configured for explicit delta caching can perform implicit ("clientless") delta caching by reference to templates maintained at one or more template-builders. In an aspect of the invention, delta-encoders also operate so that the template information and the delta information for any object can be separately compressed or sent to clients. In one embodiment, delta-encoders operate with template-builders using a client-server technique.

DETAILED DESCRIPTION OF THE PREFERRED EMBODIMENT

Figure 1:
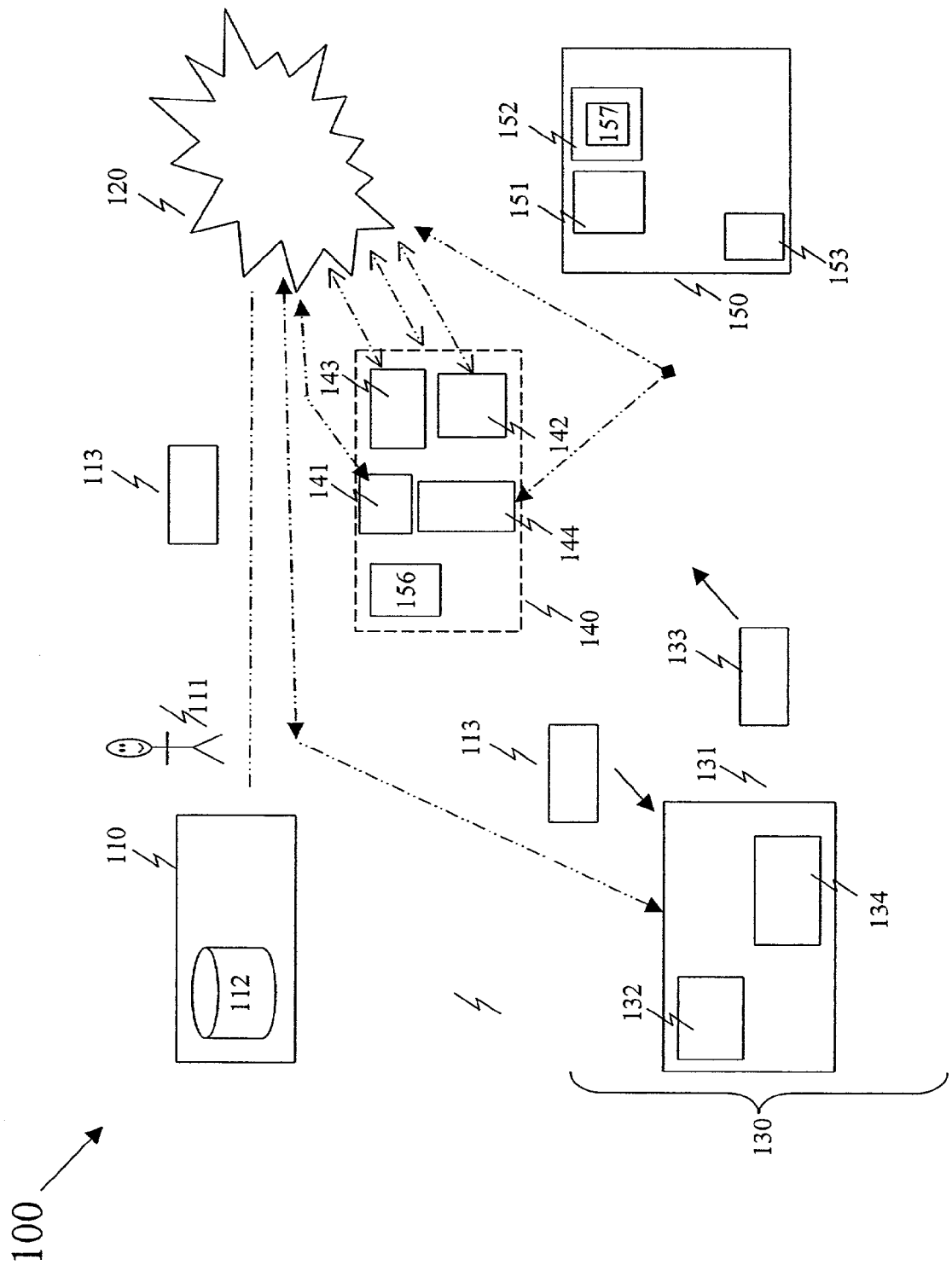
FIG. 1 shows a block diagram of a system including a delta caching service.

In the description herein, a preferred embodiment of the invention is described, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

Lexicography

The following terms relate or refer to aspects of the invention or its embodiments. The general meaning of each of these terms is intended to be illustrative and in no way limiting.

client, server—In general, these terms refer to devices or software elements operating in a client/server relationship.

There is no particular requirement that any particular client or any particular server must be a single hardware device or software module. For example, in some embodiments, the client device or the server device might include multiple devices operating cooperatively (such as when networked) or might include a portion of one or more devices.

In one embodiment, the client includes a personal computer, such as a workstation, a laptop, or a handheld computer, having a web browser disposed for requesting web objects from the server. In the same embodiment, the server includes one or more web servers, possibly coupled to a network using an element for distributing requests, each of which is disposed for parsing requests for web objects, and for providing those web objects in response thereto. The web objects might be deemed "static," in which case they are retrieved from a file system, a database, or other storage, or might be deemed "dynamic," in which case they are at least partially generated by the web server in response to information that is possibly time-varying.

There is no particular requirement that any particular client or any particular server must be a single hardware device or software module. For example, in some embodiments, the client device or the server device might include multiple devices operating cooperatively (such as when networked) or might include a portion of one or more devices.

delta caching—In general, this refers to a technique in which a client obtains information regarding a web object in at least two parts: "template information," which refers to information that might be relatively static and is (in one embodiment) retained at the client, and "delta information," which refers to changes from the template information and is (in one embodiment) provided by the server in response to a difference between a present value of the web object and the template information.

delta encoder—In general, this refers to an element that computes the delta information, such as a difference between a present value of the web object and the template information. In one embodiment, the delta encoder might compress the delta information for delivery to the client.

delta information—In general, this refers to information to be added to the template information to compose an entire web object.

encoding web object for delivery—In general, this refers to a technique in which template information is identified for the web object, delta information is computed in response to the web object and the template information, and the delta information is formatted (such as in an HTTP response message) for delivery to a requesting client.

implicit ("clientless") delta caching—In general, this refers to a delta caching technique in which delta information is formatted for delivery to a requesting client, and in which the formatted delta information includes program fragments (such as JavaScript) stimulating the client to retrieve the template information if that template information is not already at the client.

template, template information—In general, this refers to information which is relatively static, or information that has not changed since the last request for the same web object, or information retained by the client.

template builder—In general, this refers to an element that computes the template information, such as in response to a change in a web object.

web page, web object—In general, this refers to an object available at (or dynamically computed at) the server. A web object might include text, pictures, graphics, animation, video or other motion pictures, sound, program fragments or scripts, or other data. When a web object is associated with a specific URL and is intended for presentation by the client, it might be referred to as a web page.

The scope and spirit of the invention is not limited to any of these definitions, or to specific examples mentioned therein, but is intended to include the most general concepts embodied by these and other terms.

System Elements

FIG. 1 shows a block diagram of a system including a delta caching service.

A system 100 includes a client 110, a communication network 120, a server 130, a delta encoder 140, and a template builder 150.

Client

The client 110 includes a workstation having a processor, program and data memory, and mass storage, and is operated by at least one user 111. In one embodiment, the program includes a web browser, disposed for requesting web objects from the server 130, for receiving web objects from the server 130, and for presenting web objects to the user 111. The program and data memory and mass storage collectively include a client cache 112, in which the client 110 records information from the server 130 for presentation to the user 111.

The client 110 is coupled to the communication network 120, and is disposed for sending request messages 113 to the server 130. In one embodiment, the request messages 113 are formatted in a known protocol, such as HTTP (hypertext transfer protocol), SHTTP (secure HTTP), FTP (file transfer protocol), or a variant thereof. The client 110 is also disposed for receiving messages from other elements in the system 100.

Network

The network 120 includes a communication link capable of delivering information between the client 110 and other elements in the system 100. In one embodiment, the communication network 120 includes an internet. However, in alternative embodiments, the network 120 may include an intranet, a LAN or WAN, a portion of a ATM network or PSTN or other switching network, or in general any elements disposed for delivery of information.

Server

The server 130 includes at least one web server device 131. Each web server device 131 includes a processor, program and data memory, and mass storage. Each web server device 131 is disposed for receiving request messages 113, for retrieving (or dynamically generating) one or more web objects 132 in response thereto, and for formatting a response message 133 including those web objects 132.

In one embodiment, the server 130 includes a load balancer 134 and a plurality of the web server devices 131. The load balancer 134 includes a processor, and program and data memory, and is disposed for receiving request messages 113 and for delivering those request messages 113 to individual web server devices 131. This has the effect of distributing the workload of responding to request messages 113 across more than one web server device 131, so the server 130 can respond with relatively less latency to individual request messages 113. The web objects 132 might be retrieved from the mass storage, in which case they are deemed "static," or might be dynamically generated by the server 130 (specifically, by one of the web server devices 131) in response to information that might possibly be time-varying. For example, if the web object 132 specified by one of the request messages 113 includes stock quote information, the server 130 would dynamically generate that web object 132 in response to actual stock quotes (such as retrieved from a separate stock quote server).

Delta Encoder

The delta encoder 140 includes a processor, program and data memory, and mass storage, collectively including a request interceptor 141, a request forwarder 142, an object comparator 143, and a delta formatter 144.

The request interceptor 141 is coupled to the network 120, and is disposed for intercepting request messages 113 that are destined for the server 130.

The request forwarder 142 is coupled to the network 120 and to the request interceptor 141, and is disposed for forwarding the intercepted request messages 113 to the server 130.

In alternative embodiments, the server 130 might be disposed for sending all response messages 133 to the delta encoder 140, in which case the request interceptor 141 and the request forwarder 142 would not be needed. Accordingly, these elements might be regarded as optional.

The object comparator 143 is coupled to the network 120, and is disposed for receiving response messages 133 from the server 130. The object comparator 143 compares web objects 132 found in those response messages 133, using a set of template information 157 from the template builder 150, and generates delta information 156.

In one embodiment, the delta encoder 140, from time to time, sends a request to the template builder 150 for the template information 157, and records that template information 157 in its memory or mass storage. The delta encoder 140 would therefore have the template information 157 readily available for computing the delta information 156. In alternative embodiments, the delta encoder 140 sends a request to the template builder 150 for the template information 157 in response to need for that information by the object comparator 143, and uses the template information 157 relatively immediately. The delta encoder 140 would therefore have no special requirement for recording that template information 157 in its memory or mass storage.

The delta formatter 144 is coupled to the network 120 and to the object comparator 143, and is disposed for formatting the delta information 156 for delivery to the client 110. The delta formatter 144 generates a response message 133 and sends that response message 133 to the network 120 for delivery to the client 110.

In one embodiment, the delta formatter 144 compresses the delta information 156 before packaging that information in the response message 133.

Template Builder

The template builder 150 includes a processor, program and data memory, and mass storage, collectively including an object requestor 151, a template identifier 152, and a template server 153.

The object requestor 151 operates, from time to time, to request web objects 132 from the server 130. The template builder 150 receives the web objects 132 and records them in its memory or mass storage.

The template identifier 152 operates, from time to time, on web objects 132 recorded in memory or mass storage, and generates template information 157. In one embodiment, the template information 157 can be compressed by the template builder 150 for delivery to the delta encoder 140 or to the client 110.

The template server 153 operates in like manner as the server 130, in that it receives request messages 113 and sends response messages 133. However, the template server 153 provides template information 157 instead of web objects 132 in response to the request messages 113.

The template server 153 is available for responding to requests by the delta encoder 140, so the delta encoder 140 can obtain template information with which to compute delta information 156.

In alternative embodiments, the delta encoder 140 can operate to format the delta information 156 using program fragments such as JavaScript. In this mode of operation, the client 110 does not need to know that the delta information 156 does not include the entire web object 132. Rather, when the client 110 attempts to present the web object 132 (it has only the delta information 156), the program fragments direct it to request and receive template information 157 from the template server 153, in like manner as it would request and receive a web object 132 from the server 130. Accordingly, the client 110 can obtain both the delta information 156 and the template information 157, and it can present the entire web object 132.

Method of Operation

Figure 2:
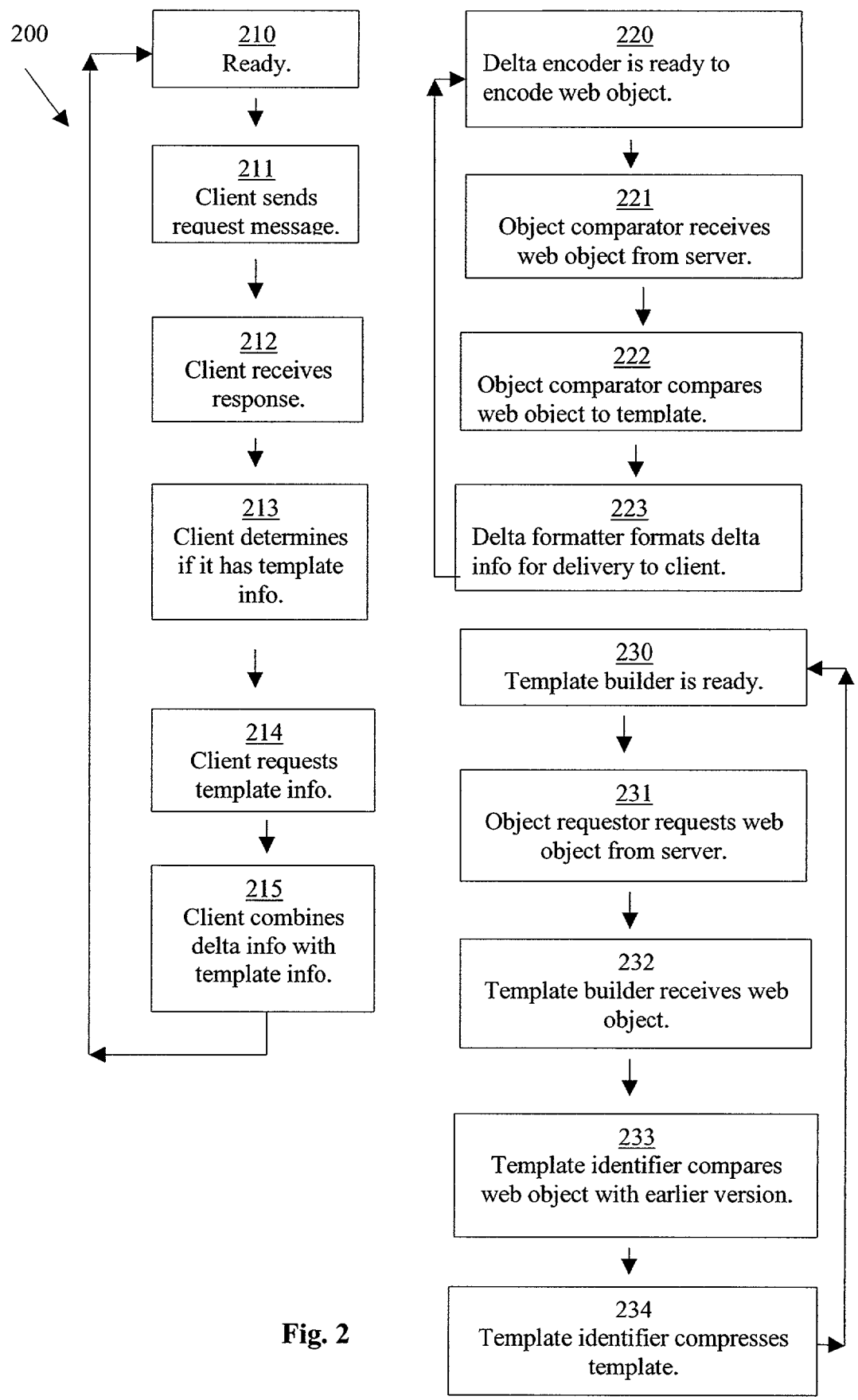
FIG. 2 shows a process flow diagram of a method including a delta caching service.

FIG. 2 shows a process flow diagram of a method including a delta caching service.

A method 200 is performed by the system 100. Although the method 200 is described serially, the flow points and steps of the method 200 can be performed by separate elements in conjunction or in parallel, whether asynchronously or synchronously, in a pipelined manner, or otherwise. There is no particular requirement that the method 200 must be performed in the same order in which this description lists flow points or steps, except where explicitly so indicated.

Client

At a flow point 210, the client 110 is ready to request a web object 132 from the server 130.

At a step 211, the client 110 sends a request message 113 to the server 130.

AT a step 212, the client 110 receives a response message 133 from the delta encoder 140, including delta information 156. In one embodiment, the client 110 recognizes the response message 133 as including only delta information 156, and the client 110 knows it must combine the delta information 156 with template information 157 to present the entire web object 132. In alternative embodiments such as "clientless" delta caching, the response message 133 includes at least one program fragment directing the client 110 to obtain the template information 157 (either from its client cache 111 or from the template server 153).

At a step 213, the client 110 determines if it has the requisite template information 157 to present the entire web object 132. If not, the client 110 proceeds with the step 214. If so, the client 110 proceeds with the step 215.

At a step 214, the client 110 requests the requisite template information 157 from the template server 153 or the delta encoder 140. Template information 157 can be served from both the template server 153 or the delta encoder 140 because they both include the template. A client 110 can be instructed to get the template information 157 from either source. Serving the template information 157 from the template server 153 is particularly advantageous in configurations in which the server 130 is not associated with a delta encoder 140.

In other embodiments, a CDN (content delivery network) can be used to serve templates information 157. Thus, there are four possibilities: 1) the template builder 150 serves template information 157 directly to the client 110, (2) the delta encoder 140 serves template information 157 directly to the client 110, (3) the template builder 150 serves template information 157 to the client through a CDN and (4) the template builder 150 serves template information 157 to the client 110 through a CDN and the delta encoder 140 serves content to a CDN, which serves it to the client 110

At a step 215, the client 110 combines the delta information 156 with template information 157 to present the entire web object 132.

The client 110 returns to the flow point 210.

Server

The server 130 operates in like manner as an ordinary web server.

Delta Encoder

At a flow point 220, the delta encoder 140 is ready to encode a web object 132 for delivery to the client 110.

At a step 221, the object comparator 143 receives the web object 132 from the server 130. As noted above, the delta encoder 140, from time to time, requests template information 157 from the template server 153, and records that template information 157 in its memory or mass storage.

At a step 222, the object comparator 143 compares the web object 132 with the template information 157, and generates delta information 156.

At a step 223, the delta formatter 144 formats the delta information 156 for delivery to the client 110, generates a response message 133 and sends that response message 133 to the network 120 for delivery to the client 110. In one embodiment, the delta formatter 144 compresses the delta information 156 before packaging that information in the response message 133.

The delta encoder 140 returns to the flow point 220.

Template Builder

At a flow point 230, the template builder 150 is ready to build template information 157. This is done the first time a web object 132 is requested and whenever the delta information 156 associated with that web object 132 grows "too large".

At a step 231, the object requestor 151 requests one of the web objects 132 from the server 130.

At a step 232, the template builder 150 receives the one web object 132 and records it in its memory or mass storage.

At a step 233, the template identifier 152 compares the one web object 132 with an earlier version of that web object 132, and generates template information 157 in response to the comparison.

At an optional step 234, the template identifier 152 compresses the template information 157.

The template builder 150 returns to the flow point 230.

The template server 153 operates in like manner as an ordinary web server, except that it provides template information 157 instead of web objects 132.

ALTERNATIVE EMBODIMENTS

Although preferred embodiments are disclosed herein, many variations are possible which remain within the concept, scope, and spirit of the invention. These variations would become clear to those skilled in the art after perusal of this application.

The invention is generally applicable to client-server processes, and to systems in which clients request information and servers provide information in request to responses, such as for example client-server database systems and client-server file systems.

Those skilled in the art will recognize, after perusal of this application, that these alternative embodiments are illustrative and in no way limiting.

The invention claimed is:

1. A method for responding to a request from a client for a web page, including steps of:
   forwarding, from a request server, the request to a template server;
   building, at the template server that is logically remote from the request server, template information for the web page;
   distributing the request from the client to a selected one of a set of delta encoders;
   providing a web object to the selected one delta encoder in response to the request;
   computing delta information for the web page based on the template information and the web object at the selected one delta encoder that is logically remote from the request server; and
   sending, to the client, the delta information for the web page and a reference to the template information.

2. The method of claim 1 including a step of compressing the delta information.

3. The method of claim 1 including a step of compressing the template information.

4. The method of claim 1 including a step of sending statistical information to the template server relating to the benefits of a delta caching service of the delta encoder.

5. The method of claim 1 wherein the template server is logically remote from the selected one delta encoder.

6. The method of claim 1 wherein:
   the distributing step comprises distributing the request to a selected one of a set of networked devices operating cooperatively together to perform delta encoding operations;
   the selected one device comprises the selected one delta encoder; and
   the template server is logically remote from the selected one device.

7. The method of claim 1 including steps of:
   receiving, from the client, a request for the template information; and
   sending, to the client, the template information.

8. The method of claim 1 including steps of
   sending, from a source of the delta information, a request for the template information; and
   receiving, at the source of the delta information, the template information.

9. The method of claim 1 wherein the delta information includes at least one program fragment.

10. The method of claim 1 wherein the delta information includes at least one program fragment directing the client to retrieve template information.

11. The method of claim 10 wherein the at least one program fragment directs the client to retrieve the template information from either the template builder, the delta encoder, or a content delivery network.

12. A method as in claim 1, wherein
   the web page is accessible to more than one the server; and
   the template information is accessible to the more than one server.

13. The method of claim 1 wherein the steps of building are responsive to at least one change in the web page.

14. A system for responding to a request from a client for a web page, comprising:
   a request server responsive to the request from the client that forwards the request and operatively configured to distribute the request from the client and a web object to a selected one of a set of delta encoders;
   a template builder disposed logically remote to the request server and responsive to the forwarded request by building template information for the web page; and
   the selected one delta encoder disposed logically remote to the request server and responsive to the distributed request by generating:
      (i) a response including delta information based on the template information and the web object, and (ii) a reference to template information for the web page.

15. The system of claim 14 including a delta information compressor.

16. The system of claim 14 wherein the template server is logically remote from the selected one delta encoder.

17. The system of claim 14 wherein the selected one delta encoder comprises a selected one of a set of networked devices operating cooperatively together to perform delta encoding operations, and wherein the template server is logically remote from the selected one device.

18. The system of claim 14 wherein the template builder is configured to send the template information to the delta encoder.

19. The system of claim 14 including a template information compressor.

20. The system of claim 14 wherein the delta encoder generates requests to and receives responses from the template builder.

21. The system of claim 14 wherein the delta encoder sends statistical information to the template builder, wherein the statistical information relates to the benefits of the delta caching service.

22. The system of claim 14 wherein the delta encoder retrieves configuration information from the template builder and uses the configuration information in a hosted configuration mechanism.

23. The system of claim 14 wherein the delta encoder retrieves a list of available templates and identifies which templates are not included in the list.

24. The system of claim 14 wherein the delta encoder requests the template builder to rebuild a template.

25. The system of claim 14 wherein the delta information includes at least one program fragment.

26. The system of claim 14 wherein the delta information includes at least one program fragment directing the client to retrieve template information.

27. The system of claim 14 wherein
the web page is accessible to more than one the server; and
the template information is accessible to the more than one the server.

28. The system of claim 14 wherein the template builder is responsive to at least one change in the web page.

29. A system for responding to a request from a client for a web page, comprising:
means forwarding from a request server the request to a template server;
means for building, at the template server that is logically remote from the request server, template information for the web page;
means for distributing the request from the client to a selected one of a set of delta encoders;
means for providing a web object to the selected one delta encoder in response to the request;
means for computing delta information for the web page based on the template information and the web object at the selected one delta encoder that is logically remote from the request server; and
means for sending, to the client, the delta information for the web page and a reference to the template information.

30. The system of claim 29 including means for compressing the delta information.

31. The system of claim 29 including means for compressing the template information.

32. The system of claim 29 including means for sending statistical information to the template server relating to the benefits of a delta caching service of the delta encoder.

33. The system of claim 29 wherein the template server is logically remote from the selected one delta encoder.

34. The system of claim 29 wherein:
the means for distributing comprises means for distributing the request to a selected one of a set of networked devices operating cooperatively together to perform delta encoding operations;
the selected one device comprises the selected one delta encoder; and
the template server is logically remote from the selected one device.

35. The system of claim 29 including:
means for receiving, from the client, a request for the template information; and
means for sending, to the client, the template information.

36. The system of claim 29 including:
means for sending, from a source of the delta information, a request for the template information; and
means for receiving, at the source of the delta information, the template information.

37. The system of claim 29 wherein the delta information includes at least one program fragment.

38. The system of claim 29 wherein the delta information includes at least one program fragment directing the client to retrieve template information.

39. The system of claim 29 wherein
the web page is accessible to more than one the server; and
the template information is accessible to the more than one the server.

40. The system of claim 29 wherein the means for building is responsive to at least one change in the web page.

* * * * *